May 9, 1961 W. ZIMMERMANN ET AL 2,983,051
APPARATUS FOR COOLING PARTICULATE MATERIALS
Filed Oct. 28, 1957 2 Sheets-Sheet 2

INVENTOR.
WILHELM ZIMMERMANN.
JOSEPH RÖDER.
BY
ATTORNEYS.

2,983,051
APPARATUS FOR COOLING PARTICULATE MATERIALS

Wilhelm Zimmermann, Frankfurt am Main, and Joseph Röder, Darmstadt, Germany, assignors to Dravo Corporation, Pittsburgh, Pa., a corporation of Pennsylvania Filed Oct. 28, 1957, Ser. No. 692,726

10 Claims. (Cl. 34—164)

This invention relates to an apparatus for contacting particulate materials with gases for the purpose of cooling the same, and is for an apparatus to accomplish this economically and effectively and with a minimum carry-off of dust particles, especially where fines of extremely small size are being processed.

Our invention has been particularly developed for the cooling of the very fine particles produced in flash roasting operations of ore and as by-product on sinter machines and elsewhere, and it will hereinafter be particularly described in connection with the treatment of such fines, but is also applicable for the cooling of larger particles, such as pellets.

The product of flash roasters as well as of sintering machines consists partly or entirely of fines ranging from 0 to 10 mm. in grain size. Upon discharge from the roaster or sintering machine, its temperature may range from 600 to 1000° C. and for further processing it must be cooled to somewhere in the neighborhood of around 100 or 150° C. or more. The material is too hot to be carried on conventional belts. Cooling is frequently accomplished by spraying water onto it and mixing the water and fines in a screw conveyor. This method is quick, but has the disadvantage that the steam carries off a substantial amount of dust which is deposited in the duct system through which the steam is withdrawn to be exhausted, or if ducts are not provided, moisture and dust accumulate on the floor, dust settles in the building in which the operation is carried on, and most unpleasant conditions are created. It has also been proposed to cool the material by moving it over the heat exchange surface which may be liquid-cooled, but this requires the circulation of a large amount of water and is generally not satisfactory.

Another method which is used involves moving the material through a vertical column in which there is an upwardly-circulating current of air, and the present invention is for an improvement in apparatus of this general type.

According to our invention there is provided a vertical cylindrical enclosure of the desired height and diameter. Within this enclosure is a central duct around which is a helical plate-like conveyor, the conveyor being supported by the duct, and it has on its surface a succession of step-like elements extending from the top to the bottom of the conveyor. Means are provided for vibrating the central column or duct, whereby the material which is discharged on the upper end of the spiral migrates down the spiral as the vibration is continued, and at each step the material falls freely onto the next-succeeding portion of the conveyor. Cooling air to be brought into contact with the solid material is introduced into the central duct, and provision is made for leading the air from this duct radially from the duct and discharging it through the risers of the steps so that as the material falls from one surface to the next, the air or other gas passes through the falling material, thereby intimately contacting the material.

Because of the very intimate contact of the air with the particles while they are falling, and the large number of steps that can be provided in a spiral construction of this kind, the air at any point can move with a very slow velocity, and therefore entrains a minimum amount of dust.

According to our invention, the interior of the cylindrical housing is also preferably provided with air baffling means so that the air flow is confined generally parallel with the surface of the conveyor, moving counter-current in a spiral path over the surface of the material on the conveyor. The air upon reaching the top of the housing, may be carried through a cyclone or other dust collecting device to remove the small amount of dust which may be entrained in it.

The primary object of our invention therefore is to provide an effective apparatus for intimately contacting solid particles with cooling air, which is of unique construction, and in which large volumes of air can be used at relatively low velocities, and under conditions which bring the particles and gas into intimate contact without entraining an undesirable amount of dust.

A further object of our invention is the provision of a cooling apparatus which will provide a long path of travel with exposure to cooling air in a small area of a plant.

Our invention may be more fully understood by reference to the accompanying drawings, in which:

Fig. 1a is a schematic perspective view of one form of vibrating mechanism.

Figure 1:
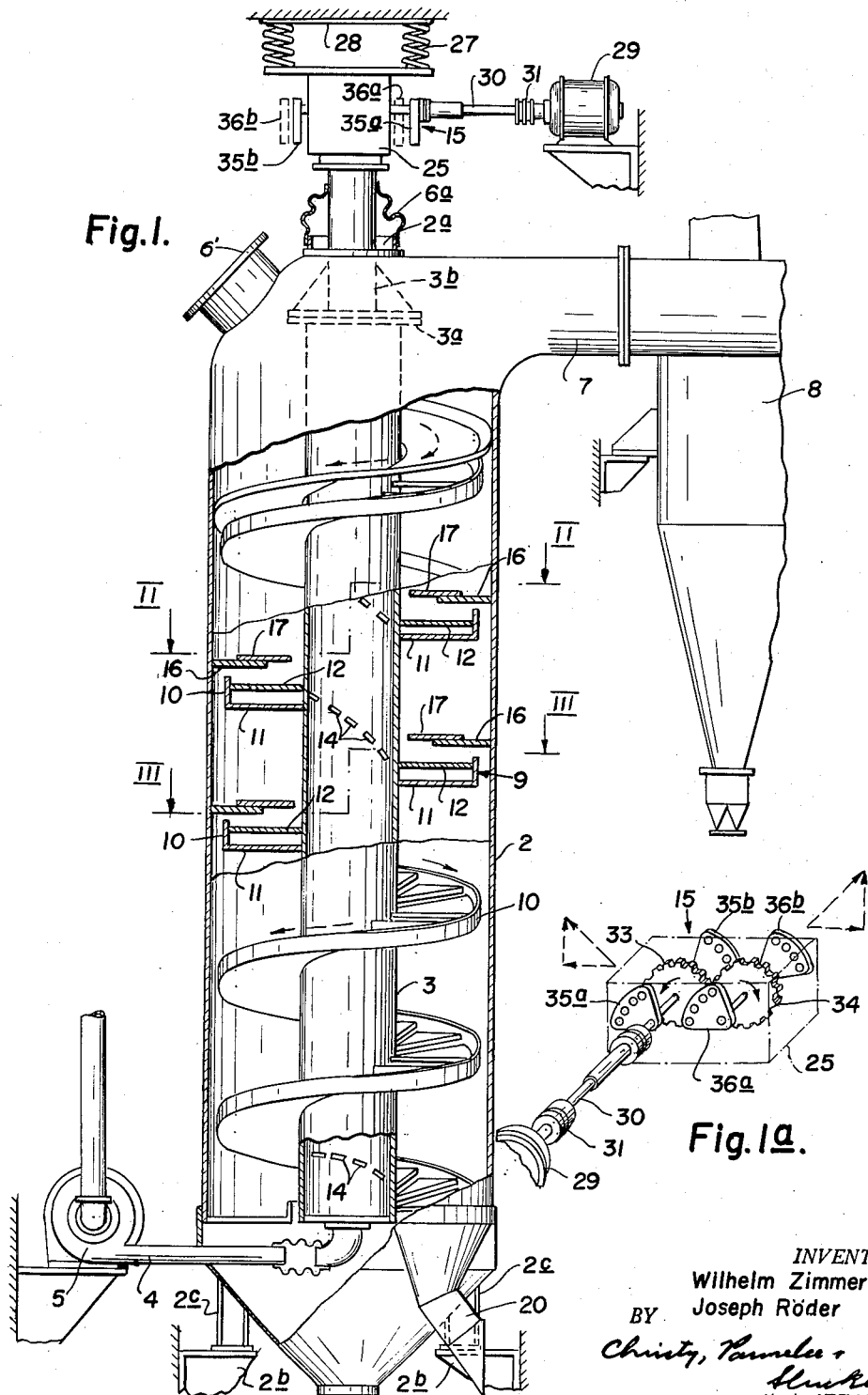
Fig. 1 is a view partly in side elevation and partly in vertical section showing an apparatus embodying our invention.

Referring to the drawings, 2 designates a vertical cylindrical housing having an axially-extending hollow column or duct 3 reaching from the top to the bottom, with the top projecting through an opening 2a in the top of the housing. The upper end of the column is closed by a plate 3a and above this there is a portion 3b constituting an operating extension. At the bottom of the housing there is shown a pipe 4 through which air or other gas may be introduced into the bottom of the column 3, and 5 designates a blower by means of which the circulation of the air or other gas may be induced. The housing as here shown is supported on a fixed foundation 2b through supporting columns 2c. The top of the housing 2 is in the form of a hood 6, and extending from this hood is a duct 7 that discharges into a dust collector such as a cyclone collector 8 of any known or preferred construction. A flexible seal 6a is provided on the hood attached to 3b of the column which it encircles and attached to the hood. As hereinafter more fully described, the column or duct 3 is suspended from or supported by a vibrator and is independent of the housing.

Secured around the outside of the duct or hollow column 3 is a spiral conveyor designated generally as 9. It has an exterior side wall 10, while the interior boundary of the conveyor is formed by the duct. The conveyor is comprised of a helical bottom plate 11 which is a continuous smooth spiral plate, and secured to the surface of this plate are a succession of radially arranged relatively horizontal step-forming plates 12 with downwardly-extending forward edges 13 (see Fig. 4), thereby providing a succession of steps on the top of the plate 11. The lower edge of the flange or lip 13 of each step is spaced a slight distance above the plate 11, and each plate 12 is joined to the plate 11 at a point close to, if not directly under, the downwardly-turned lip 13 of the step next above it.

There is an opening 14 through the central column or duct under each step 12 and above the plate 11 so that air from the interior of the column may flow into the space under each step and escape from under the downturned lip 13.

In the top of the housing there is a feed inlet connection 6a through which hot material may be charged onto the upper end of the conveyor. Movement of the material down the conveyor at a predetermined speed is accomplished by vibrating the column in a manner to cause migration of the particles from one step to the next. Such vibrators are available commercially, and we have here shown such a vibrator conventionally at the top of the column at 15 for clearness of illustration, but may be elsewhere located. By varying the frequency and amplitude of the vibration caused thereby the speed of travel of the material and thereby its residence time within the apparatus can be variated. One such vibrator, using oppositely rotating counterweights is the "Schenck Helical Exciter" manufactured by Carl Schenck Corporation of Darmstadt, Germany, such as disclosed in United States Patent No. 2,934,202, granted April 26, 1960 on an application filed September 5, 1956 in the name of J. Roder et al.

The aforementioned vibrator 15 comprises a gear housing 25 carried on a plate 26 suspended through spring mounting 27 from a plate 28 fixed to the ceiling or overhead structure above the cooler. The vibrator mechanism as shown in Fig. 8, and which forms no part of this invention, includes a motor 29 that drives shaft 30 through a flexible coupling 31, the motor being on a fixed support 32. The shaft 31 has a gear 33 that drives a gear 34 on a parallel shaft in the opposite direction. Shaft 30 has two angularly-separated eccentric weights 35a and 35b thereon and the parallel shaft has two similar angularly-separated eccentric weights 36a and 36b. The weights 35a and 36a come into phase relation at the position shown in Fig. 8, and 180° from this position, but elsewhere, since they are moving in opposite directions, are out of phase. The weights 36a and 36b come into phase relation at the same time as do 35a and 35b, but at a different angle. As the weights come into phase relation, they exert forces to give directional movement to the particles on the conveyor, as will be understood by those skilled in the art.

Figure 2:
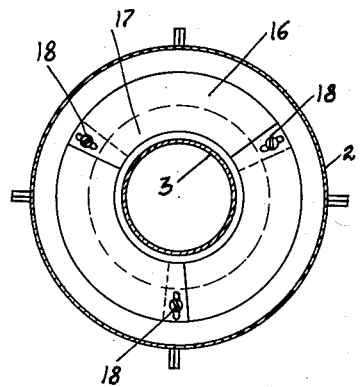
Fig. 2 is a transverse section in the plane of line II—II of Fig. 1.
Figure 3:
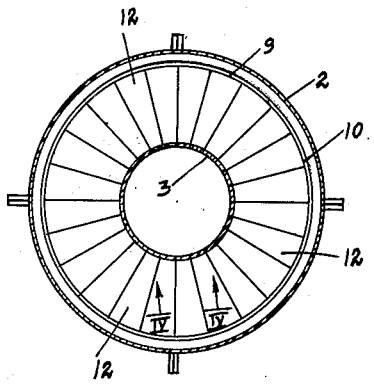
Fig. 3 is a transverse section in the plane of line III—III of Fig. 1.

As the material drops over each step, it falls freely through space and the air emerging from the under lip 13 of the step passes through it and cools it. To improve the cooling action of the air and also conduct heat to the surrounding housing from which the heat is dissipated, we provide a spiral baffle plate 16 on the interior wall of the housing parallel with, but spaced above the spiral conveyor on the center column, this baffle extending toward, but preferably not to, the center column. It may be desirable in some installations to have the baffle adjustable toward and away from the column, and for this purpose a series of adjustable baffle plates 17 with overlapping ends may be bolted to the baffle 16. This is schematically shown in Fig. 1 and is also shown in Fig. 2 where the dotted line indicates the end of a baffle plate, and a nut and bolt is indicated at 18, this bolt passing through plate 16 and slots in the lapped ends of plates 17. This baffle 16 or 16—17 causes the air to move countercurrent over the vibrating particles on the surface of the conveyor.

Figure 4:
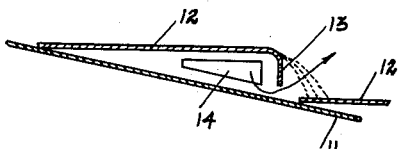
Fig. 4 is a fragmentary detail view on a larger scale, being a transverse section on line IV—IV of Fig. 3, showing one form of conveyor step.
Figure 5:
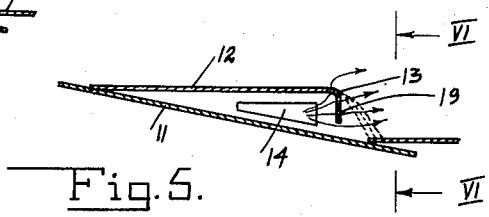
Fig. 5 is a view similar to Fig. 4, showing a modification of the arrangement shown in Fig. 4.
Figure 6:
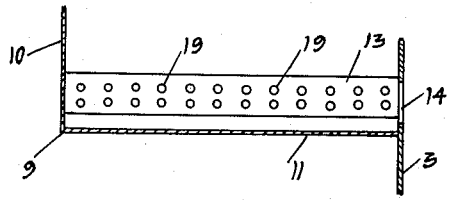
Fig. 6 is a vertical section in the plane of line VI—VI of Fig. 5.

In Figs. 5 and 6 we have shown a slight modification in which the edge and lip of the step are perforated. In the view the parts are the same as in Fig. 4 and similar reference numerals have been used to designate the corresponding parts, but perforations 19 have been shown so as to secure greater contact between the air and the particles.

Figure 7:
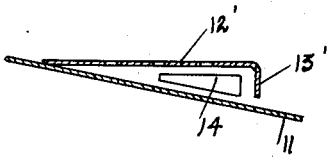
Fig. 7 is a view similar to Fig. 5 showing still another form of step arrangement.

In Fig. 7 there is another form of step designated 12' having a lip 13' as shown in Fig. 4, but there are also openings in the top surface of the step. In this instance some or all of the material may sift through the opening in small streams while being contacted with the air, some of which rises through the openings.

The material from the conveyor discharges into a discharge chute 20 at the bottom of the housing.

The apparatus as described provides a long path of travel for the material in a relatively small space. It is inexpensive from a structural standpoint and highly effective in cooling the material. The small amount of dust that is entrained in the air is largely removed in the dust collector to which the air flows upon leaving the top of the cooling apparatus.

It will be apparent that while we have shown certain embodiments of our invention, other changes and modifications may be made within the contemplation of our invention.

We claim:

1. Apparatus for cooling hot particles comprising a housing, a helical vibratory conveyor plate in the housing, means in the housing for supporting the conveyor plate for vibrating the same, means defining a succession of steps on the surface of the conveyor plate down which the particles travel when the conveyor is vibrated, means for discharging air into the space between the conveyor plate and the under surface of the steps, and vents through which the air may flow from beneath the steps through material falling from the steps onto the conveyor plate, means for vibrating the conveyor, and means for supplying particles to be cooled to the upper end of the conveyor.

2. Material cooling apparatus of the class described comprising a hollow central column, a composite vibratory conveyor comprising a helical plate supported by and entwined about the column, means defining a succession of steps extending outwardly from the plate in a plane generally horizontal with respect to the plate with a space being formed between the under side of the step and the plate, there being an opening through the column into the said space under each step, and means for vibrating the column.

3. Material cooling apparatus as defined in claim 2 in which each step has a downwardly-turned flange at its outer edge extending toward the surface of the helical plate but spaced from the plate to provide an air vent.

4. Material cooling apparatus as defined in claim 2 in which the steps are perforated so that air may flow from the space under the step.

5. Material cooling apparatus as defined in claim 2 in which there is a cylindrical housing surrounding the conveyor, a hood at the top of the housing having an air outlet duct, and means for supplying air to the interior of the column.

6. Material cooling apparatus as defined in claim 5 in which the housing is separated from the conveyor so that it is not vibrated with the conveyor, and a helically formed air baffle on the interior of the housing extending inwardly from the housing over the conveyor and spaced above it.

7. Material cooling apparatus as defined in claim 5 in which the housing is separated from the conveyor so that it is not vibrated with the conveyor, a helically formed air baffle on the interior of the housing extending inwardly from the housing over the conveyor and spaced above it, and means on the baffle for adjustably varying its effective width.

8. Material cooling apparatus as defined in claim 5 in which the housing is separated from the conveyor so that it is not vibrated with the conveyor, a helically formed air baffle on the interior of the housing extending horizontally inwardly from the housing over the conveyor and spaced above it, said baffle having separate radially-adjustable baffle plates thereon adjustable relatively to the baffle toward and away from the center column.

9. A conveyor for use in cooling finely-divided hot material comprising a central vertical hollow column, a helical vane encircling the exterior of the column and secured thereto, a succession of plates on the vane the slope of which is more nearly horizontal than the pitched surface of the vane to provide a succession of steps and providing under each step forming plate an angular air space, each step-forming plate having a downwardly-turned flange forming a riser portion for each step, means providing an air passage through the riser portion, the column having an air passage therethrough opening into the angular space between the spiral vane and the step-forming plate, means for inducing a circulation of air through the column and the riser portion of each step, and means for vibrating the conveyor.

10. A conveyor as defined in claim 9 in which the helical vane has an upturned flange at its outer edge closing the ends of the angular air spaces under the plates remote from the column.

References Cited in the file of this patent

UNITED STATES PATENTS

| | | |
|---|---|---|
| 2,312,034 | Gaffney | Feb. 23, 1943 |
| 2,688,807 | Ginther | Sept. 14, 1954 |
| 2,759,274 | Jonsson | Aug. 21, 1956 |
| 2,794,266 | Bradfield | June 4, 1957 |

FOREIGN PATENTS

| | | |
|---|---|---|
| 261,489 | Germany | June 23, 1913 |